(12) United States Patent
Tofigh et al.

(10) Patent No.: US 12,700,730 B2
(45) Date of Patent: Aug. 4, 2026

---

(54) POWER DISTRIBUTION SYSTEM AND METHOD OF USING THE SAME

(71) Applicant: LEACH INTERNATIONAL CORPORATION, Buena Park, CA (US)

(72) Inventors: Farshid Tofigh, Mission Viejo, CA (US); Anhtai Le Tran, Garden Gove, CA (US); Shahriar Sheybani, Buena Park, CA (US); Kyle Richard Cantu, Santa Fe Springs, CA (US); Chad Uyehara, Honolulu, HI (US)

(73) Assignee: Leach International Corporation, Buena Park, CA (US)

( * ) Notice: Subject to any disclaimer, the term of this patent is extended or adjusted under 35 U.S.C. 154(b) by 0 days.

(21) Appl. No.: 18/892,223

(22) Filed: Sep. 20, 2024

(65) Prior Publication Data

US 2026/0088614 A1      Mar. 26, 2026

(51) Int. Cl.
*H02J 3/0012* (2026.01)
*H02J 9/06* (2006.01)
*H02J 105/30* (2026.01)

(52) U.S. Cl.
CPC ............ *H02J 3/0012* (2020.01); *H02J 9/068* (2020.01); *H02J 2105/32* (2026.01)

(58) Field of Classification Search
CPC ....... H02J 3/0012; H02J 9/068; H02J 2310/44
(Continued)

(56) References Cited

U.S. PATENT DOCUMENTS

| | | | |
|---|---|---|---|
| 4,992,683 A | 2/1991 | Robin | |
| 6,703,889 B2 | 3/2004 | Dodson, III | |
| | (Continued) | | |

FOREIGN PATENT DOCUMENTS

| | | |
|---|---|---|
| JP | 2014-138531 A | 7/2014 |
| JP | 2018-147007 A | 9/2018 |
| | (Continued) | |

OTHER PUBLICATIONS

International Search Report issued in corresponding International Application No. PCT/US2025/038333, dated Nov. 20, 2025, 3 pages.

(Continued)

*Primary Examiner* — Richard Tan
(74) *Attorney, Agent, or Firm* — Womble Bond Dickinson (US) LLP

(57) ABSTRACT

A power distribution system includes a first electrical bus coupled to a first power source for providing electrical power to the first electrical bus; a second electrical bus coupled to a second power source for providing electrical power to the second electrical bus; a bus bridge for selectively coupling the first and second electrical buses, and including a first power control device including a first switch coupled between the first electrical bus and the second electrical bus, and configured to perform determining whether a second fault signal indicating failure of the second power source has been received; determining whether a reverse current is flowing from the second electrical bus to the first electrical bus; and in response to determining that the reverse current is flowing and determining that the second fault signal is not received, activating the first switch to enable current flow between the first and second electrical buses.

22 Claims, 5 Drawing Sheets

(58) Field of Classification Search
USPC ........................................................ 307/64
See application file for complete search history.

(56) References Cited

U.S. PATENT DOCUMENTS

| | | | |
|---|---|---|---|
| 8,148,848 | B2 | 4/2012 | Rusan et al. |
| 8,553,373 | B2 | 10/2013 | Rozman et al. |
| 8,582,262 | B2 | 11/2013 | Divan |
| 8,988,912 | B2 | 3/2015 | Tofigh et al. |
| 10,177,554 | B2 | 1/2019 | Wu et al. |
| 10,263,414 | B2 | 4/2019 | Hou et al. |
| 10,289,137 | B2 | 5/2019 | Leong et al. |
| 10,566,787 | B2 | 2/2020 | Rodrigues et al. |
| 10,720,768 | B2 | 7/2020 | Asanza Maldonado |
| 11,722,130 | B1 | 8/2023 | Tran et al. |
| 2002/0135235 | A1* | 9/2002 | Winick ................ H03K 17/302 307/87 |
| 2005/0083625 | A1 | 4/2005 | Thiery |
| 2008/0062730 | A1 | 3/2008 | Wirtzberger |
| 2011/0285202 | A1 | 11/2011 | Rozman et al. |
| 2013/0063116 | A1 | 3/2013 | Sun et al. |
| 2013/0301175 | A1 | 11/2013 | Posat |
| 2016/0336754 | A1 | 11/2016 | Radulescu et al. |
| 2019/0190512 | A1 | 6/2019 | Takuma |
| 2021/0143634 | A1 | 5/2021 | Molligoda et al. |
| 2021/0249955 | A1 | 8/2021 | Routledge |
| 2023/0129971 | A1 | 4/2023 | Heinrich et al. |
| 2023/0246615 | A1 | 8/2023 | Arnold et al. |

FOREIGN PATENT DOCUMENTS

| | | |
|---|---|---|
| WO | 97-18612 A1 | 5/1997 |
| WO | 2023214961 A1 | 11/2023 |

OTHER PUBLICATIONS

International Written Opinion issued in corresponding International Application No. PCT/US2025/038333, dated Nov. 20, 2025, 6 pages.
International Search Report issued in corresponding international application No. PCT/US2025/038329, dated Nov. 19, 2025, 3 pages.
International Written Opinion issued in corresponding international application No. PCT/US2025/038329, dated Nov. 19, 2025, 5 pages.

* cited by examiner

POWER DISTRIBUTION SYSTEM AND METHOD OF USING THE SAME

CROSS-REFERENCE TO RELATED APPLICATION(S)

The present application is also related to U.S. patent application Ser. No. 18/892,218, filed Sep. 20, 2024, entitled "SYSTEM AND METHOD FOR SOLID STATE POWER CONTROL WITH HIGH REVERSE CURRENT", the entire content of which is hereby expressly incorporated by reference.

FIELD

Aspects of embodiments of the present disclosure are generally related to switching devices in power distribution systems and methods of using the same.

BACKGROUND

In many electrical power distribution applications, such as airborne applications, power of different electrical sources are shared between electrical power distribution equipment to provide redundancy and to ensure the continued operation of the system even when one or more power sources go offline. This is accomplished by interconnecting two or more power distribution equipment though some switchgears to share their power sources.

For example, in an aircraft, each wing engine may run its own respective generator that powers a portion of the electrical system of the aircraft. When one generator fails, the corresponding electrical system loses its power. Without power sharing, this could lead to catastrophic failure. As such, it is desired to use a suitable power sharing mechanism that allows one part of the electrical system to share its power with another part of the electrical system when that portion is experiencing a power failure.

The above information disclosed in this Background section is only for enhancement of understanding of the present disclosure, and therefore it may contain information that does not form the prior art that is already known to a person of ordinary skill in the art.

SUMMARY

Aspects of some embodiments of the present disclosure are directed to a power distribution system with power blocks that are coupled together through a bus bridge (e.g., cross-tie) utilizing two power control devices at opposite ends of a cross-tie. In some embodiments, when one of the power blocks experiences a power loss, the power control devices operate independently in a manner that allows the sharing of electrical power from the functional power block to the one experiencing loss of power.

According to some embodiments of the present disclosure, there is provided a power distribution system including: a first electrical bus coupled to a first power source configured to provide electrical power to the first electrical bus; a second electrical bus coupled to a second power source configured to provide electrical power to the second electrical bus; a bus bridge configured to selectively couple the first and second electrical buses, and including: a first power control device including a first switch coupled between the first electrical bus and the second electrical bus, and configured to perform: determining whether a second fault signal indicating failure of the second power source has been received; determining whether a reverse current is flowing from the second electrical bus to the first electrical bus; and in response to determining that the reverse current is flowing and determining that the second fault signal is not received, activating the first switch to enable current flow between the first and second electrical buses.

In some embodiments, the first power control device is further configured to perform, in response to the determining that the reverse current is flowing: determining that the reverse current exceeds a first limit, and wherein the activating the first switch is in response to determining that the reverse current exceeds the first limit.

In some embodiments, the first power control device is further configured to perform, in response to the determining that the reverse current is flowing: measuring the reverse current through the first switch; determining that the reverse current is less than a second limit; and in response, deactivating the first switch to shut off current flow between the first and second electrical buses.

In some embodiments, the second limit is less in magnitude than the first limit.

In some embodiments, the activating the first switch in response to the determining the reverse current is flowing provides a low-resistance path for the reverse current from the second electrical bus to the first electrical bus.

In some embodiments, the first power control device is further configured to perform: in response to determining that there is no reverse current and determining that no external control signal has been received, deactivating the first switch to shut off current flow between the first and second electrical buses.

In some embodiments, the first power control device is configured to receive the second fault signal is from a second power monitor coupled to the second power source, and the second power monitor is configured to monitor the second power source and to generate the second fault signal in response to the failure of the second power source.

In some embodiments, the bus bridge is an only path of current conduction between the first and second electrical buses.

In some embodiments, the bus bridge further includes: a cross-tie configured to conduct current between the first and second electrical buses, wherein the cross-tie is coupled electrically in series with the first power control device between the first and second electrical buses.

In some embodiments, the first power control device is further configured to limit a current flowing through the first switch to a current limit.

In some embodiments, the power distribution system further includes: in response to determining that the second fault signal is received, activating the first switch to enable current flow between the first electrical bus to the second electrical bus, wherein the activating the first switch in response to the determining that the second fault signal is received provides a low-resistance path for a current from the first electrical bus to the second electrical bus.

In some embodiments, the first power control device is further configured to perform, in response to the activating the first switch, determining a rate of change of a voltage drop across the first power control device; determining to shut off current based on the current flowing between the first and second electrical buses and the rate of change of the voltage drop; and deactivating the first switch to block current flow between and electrically isolate the first and second electrical buses.

In some embodiments, the power distribution system further includes: a second power control device including a second switch coupled electrically in series with the first power control device and the second electrical bus, wherein, in response to current flowing from the first electrical bus to the second electrical bus, the second power control device is configured to automatically activate the second switch to provide a low-resistance current path from the first electrical bus to the second electrical bus.

In some embodiments, the power distribution system further includes: a first power monitor configured to monitor the first power source and to generate a first fault signal in response to failure of the first power source, wherein the bus bridge further includes: a second power control device including a second switch coupled electrically in series with the first power control device and the second electrical bus, and configured to perform: determining whether a current is flowing from the first electrical bus to the second electrical bus; determining whether a second fault signal indicating failure of the first power source has been received; and in response to determining that the reverse current is flowing and determining that the first fault signal is not received, activating the second switch to enable current flow between the first and second electrical buses.

In some embodiments, the second power control device is further configured to perform: in response to identifying that there is no current flowing from the first electrical bus to the second electrical bus and identifying that the second fault signal has not been received, deactivating the second switch to shut off current flow between the first and second electrical buses.

In some embodiments, the second power control device is configured to receive the first fault signal is from a first power monitor coupled to the first power source, and wherein the first power monitor is configured to monitor the first power source and to generate the first fault signal in response to the failure of the first power source.

According to some embodiments of the present disclosure, there is provided a method of controlling current flow between a first electrical bus of a first power block and a second electrical bus of a second power block, the method including: identifying, by a first power control device of the first power block, whether a fault signal has been received from the second power block indicating a power fault at the second power block; identifying, by the first power control device, whether a reverse current is flowing from the second electrical bus to the first electrical bus; and in response to at least one of identifying the reverse current and identifying that the second fault signal is received, activating, by the first power control device, a first switch to enable current flow between the first and second electrical buses, wherein the first and second power control devices are coupled in series between the first and second electrical buses.

In some embodiments, in response to current flowing from the first power block to the second power block, the second power control device is configured to automatically activate a second switch to provide a low-resistance current path from the first power block to the second power block.

In some embodiments, the method further includes: in response to identifying that there is no reverse current and identifying that no external control signal has been received, deactivating the first switch to shut off current flow between the first and second electrical buses.

In some embodiments, a cross-tie is coupled in series between first and second power control devices and is an only path of current conduction between the first and second electrical buses.

In some embodiments, the method further include, in response to the activating the first switch: determining a rate of change of a voltage drop across the first power control device; determining to shut off current based on the current flowing between the first and second electrical buses and the rate of change of the voltage drop; and deactivating the first switch to block current flow between and electrically isolate the first and second electrical buses.

In some embodiments, the first power control device determines to shut off current by: determining that the current is above a first threshold; and determining that the rate of change of the voltage drop is less than a second threshold.

Other aspects, features, and characteristics that are not described above will be more clearly understood from the accompanying drawings, claims, and detailed description.

BRIEF DESCRIPTION OF THE DRAWINGS

The accompanying drawings, together with the specification, illustrate example embodiments of the present disclosure, and, together with the description, serve to explain the principles of the present disclosure.

DETAILED DESCRIPTION

Figure 1:
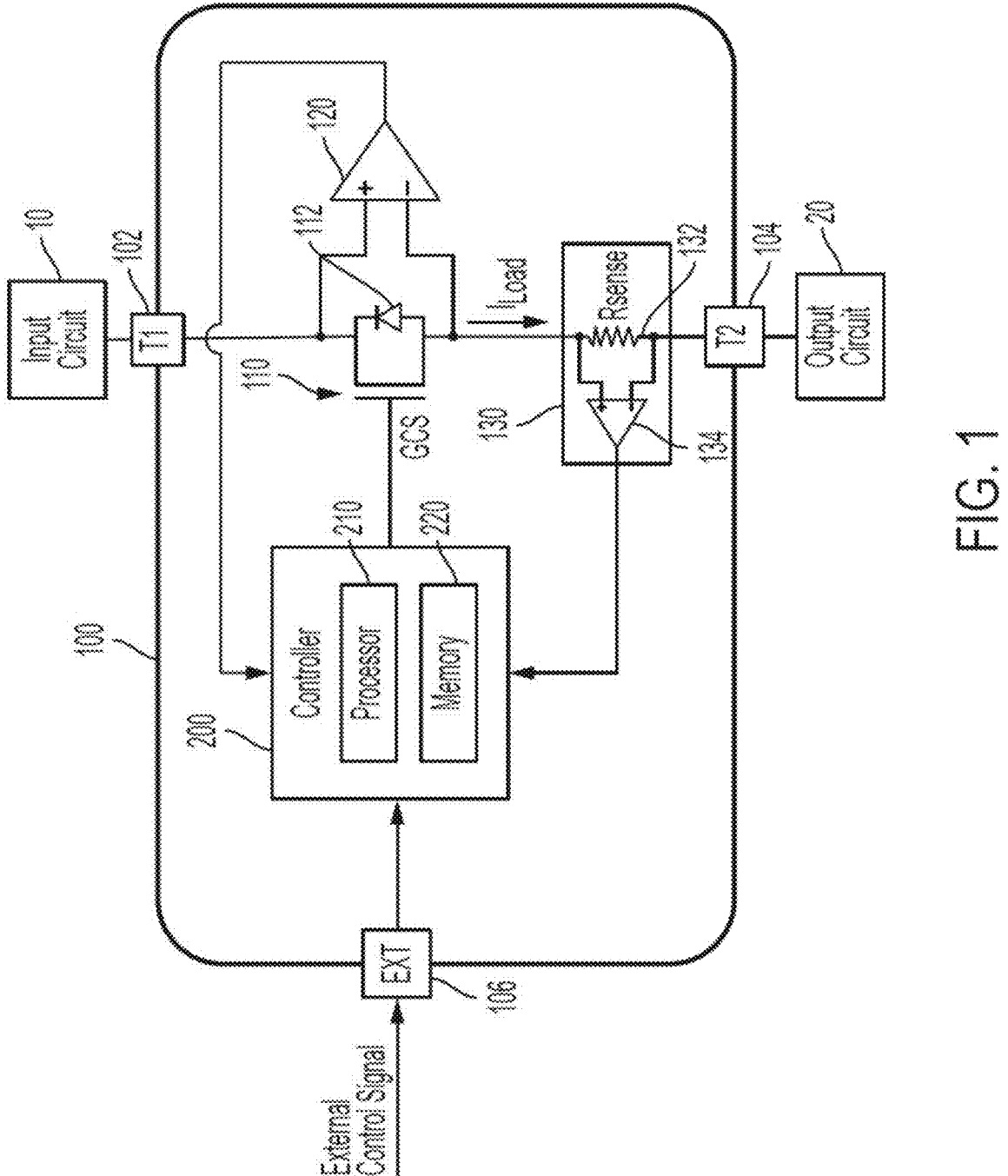
FIG. 1 illustrates a power control device coupled between an input power source and a load, according to some exemplary embodiments of the present disclosure.

The detailed description set forth below is intended as a description of example embodiments of a system and method for failure detection, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

A person of ordinary skill in the art would appreciate, in view of the present disclosure in its entirety, that each suitable feature of the various embodiments of the present disclosure may be combined with each other, partially or entirely, and may be technically interlocked and operated in various suitable ways, and each embodiment may be implemented independently of each other or in conjunction with each other in any suitable manner unless otherwise stated or implied.

In the present disclosure, processes, elements, and techniques that are not considered necessary for those having ordinary skill in the art to have a complete understanding of the aspects and features of the present disclosure may not be described or may be only briefly described. In the drawings, the relative sizes of elements, layers, and regions may be exaggerated for clarity.

Aspects of embodiments of the present disclosure are directed to a power control device that is capable of quickly detecting and automatically responding to reverse current by providing a low-resistance path for the reverse current, and capable of blocking forward current in the absence of an external control signal (e.g., an enable signal). In some embodiments, the power control device provides a low-resistance path for forward current, in response to the external control signal. According to some embodiments, the power control device is a high-reverse current power controller configured to automatically turn-on an internal solid-state switch (e.g., a MOSFET) when a reverse current flow (e.g., from a source to a drain of a MOSFET) is detected through the body diode of the solid-state switch, to turn-on the solid state switch in response to the external signal, and to turn OFF the solid-state switch otherwise.

In some embodiments, the power control device is capable of quickly differentiating between resistive short-circuit currents and capacitive inrush currents by relying not only on the magnitude of the current passing through a solid-state switch, but also on the rate of change in voltage (dV/dt or $dV_{DS}/dt$) across the drain to source of the solid-state switch. This allows the power control device to avoid nuisance trips (e.g., switch shutting off current on the wire in the case of a high inrush capacitive current charging the capacitive load) while facilitating simpler wire protection circuit designs to protect against short-circuit and overload conditions.

FIG. 1 illustrates a block diagram of a power control device 100 coupled between an input power source and a load, according to some exemplary embodiments of the present disclosure.

In some embodiments, the power control device 100 is in a path between a first circuit (e.g., an input circuit) 10 and a second circuit (e.g., an output circuit) 20, and monitors and manages the transfer of electrical power between the first and second circuits 10 and 20. The first circuit 10 may be coupled to the first terminal 102 of the power control device 100, and the second circuit 20 may be coupled to the second terminal 104 of the power control device 100. In some embodiments, the first circuit 10 may be an input power source, and the second circuit 20 may be a system load or a load circuit. However, embodiments of the present disclosure are not limited thereto. For example, in some embodiments, both of the input circuit 10 and output circuit 20 are electrical buses (e.g., busbars or conductive wires/cables) of a larger power distribution system with one or more power sources and/or load circuits connected to the corresponding electrical buses, and the power control device 100 facilitates the transfer (e.g., bi-directional transfer) of power between the two electrical buses 10 and 20.

The power control device 100 may be configured to protect the wiring/cables and/or other equipment connected to the input circuit 10 and output circuit 20 from damage caused by excess current (e.g., from a short circuit at the output circuit 20). In other words, the power control device 100 interrupts current flow in response to detecting a fault. The power control device 100 may accurately measure current, provide low loss switching with controlled rise and fall times that can reduce EMI emissions, very rapid short circuit response, I2t (current squared over a time period) overload protection, and/or the like. The output circuit 20 may, for example, be a conductive wire/cable, an external circuit, and/or the like.

In some embodiments, the power control device 100 includes a solid-state switch 110, a voltage sensor 120, a current sensor 130, and a controller 200.

The switch 110 may be a field effect transistor (e.g., an NMOS FET or nFET) having its drain and source electrodes connected between (e.g., in series with) the first circuit 10 and the second circuit 20, respectively. The voltage sensor 120 may be an operational amplifier (e.g., an error amplifier) having its input terminals connected across the source and drain terminals of the switch 110, and is configured to measure the voltage drop across the switch 110 (e.g., to measure the drain-source voltage $V_{DS}$) and to generate a corresponding switch voltage. The current sensor 130 is connected electrically in series with the switch 110 and is configured to measure the magnitude of the load current $I_{LOAD}$. In some examples, the current sensor 130 may include a sense resistor (Rsense) 132 coupled electrically in series with the switch 110 and the output circuit 20, and an operational amplifier 134 coupled across the resistor 130 for generating a signal corresponding to load current $I_{LOAD}$ for transmission to the controller 200. However, embodiments of the present disclosure are not limited thereto, and each of the voltage sensor 120 and current sensor 130 may include any suitable sensor. For example, the current sensor 130 may include a hall-effect sensor or the like.

According to some embodiments, the controller 200 is configured to control current flow between the first terminal 102 and the second terminal 104 by selectively activating (e.g., turning ON) and deactivating (e.g., turning OFF) via a gate control signal GCS supplied to the gate electrode of the solid-state switch 110. Hereinafter, supplying a gate control signal may refer to providing a "gate on" voltage, and stopping the supply of, or not supplying, the gate control signal may refer to providing a "gate off" voltage.

In a default state, the controller 200 may maintain the switch 110 in a deactivated (e.g., OFF) state to prevent the flow of current from the first terminal 102 (or the first circuit 10) to the second terminal 104 (or the second circuit 20). However, due to existence of the intrinsic body diode of the solid-state switch 110, even when the switch 110 is deactivated, a reverse current (e.g., a limited reverse current from the source to a drain of the FET(s) constituting the switch 110) may flow from the second terminal 104 (or the second circuit 20) toward the first terminal 102 (or the first circuit 10). In some embodiments, when the controller 200 detects the reverse current from the second terminal 104 to the first terminal 102, the controller 200 automatically activates (i.e., turns ON) the solid-state switch 110 to provide a low-resistance path for the reverse current. This allows greater reverse current to flow through the power control device 100. This may occur within a few microseconds to prevent the body diode 112 from conducting high current and thus causing high power dissipation of device 100 and significant power loss.

In some embodiments, when the controller 200 does not detect a reverse current, for example, when the current sensor 130 does not sense a reverse current or senses a forward current from the first terminal 102 to the second terminal 104 (e.g., a current from a drain to a source of one or more FETs of the switch 110), the controller defaults to deactivating (e.g., turning OFF) the switch 110 to shut off current from the first terminal 102 to the second terminal 104. In such a mode, when the controller 200 identifies an external signal received at the external control terminal (EXT) 106 of the power control device 100, the controller 200 activates (e.g., turns ON) the switch 110 to provide a low-resistance path for the forward current from the first terminal 102 to the second terminal 104. The external control signal (also referred to as an enable or force-on signal) may be transmitted from a circuit external to the power control device 100, such as a power monitor circuit.

When the switch 110 is active (e.g., ON), the controller 200 monitors the current and voltage drop of the switch 110 to ensure that the power control device 100 remains within acceptable operational boundaries.

In some embodiments, the controller 200 is configured to generate a derivative signal (e.g., a voltage signal) corresponding to the rate of change of the voltage drop across the switch 110 ($dV_{DS}/dt$) based on the switch voltage from the voltage sensor 120. According to some embodiments, the controller 200 is configured to rapidly detect resistive short-circuit events and capacitive overload conditions based on the load current $I_{LOAD}$ and the rate of change of the voltage drop, and to generate a corresponding switch control signal to control the state (e.g., on/off state) of the switch 110.

For example, when the magnitude of the sensed current is high, that is, the sensed current is greater than a first threshold, and the rate of voltage change across the switch 110 is low, that is, the rate of change is less than a first threshold, the controller 200 determines that the high current is a result of a resistive short circuit and generates the gate control signal in such a way as to deactivate/turn off the switch 110. This may prevent damage to the switch 110 and/or one or more of the first and second circuits 10 and 20 that may otherwise result from this resistive short-circuit condition. Further, when the magnitude of the sensed current is high, that is, the sensed current is greater than the first threshold, and the rate of voltage change across the switch 110 is also high, that is, the rate of change is greater than or equal to a second threshold, the controller 200 determines that the high current is due to inrush current into a capacitive load and generates the gate control signal in such a way as to maintain the activate/on state of the switch 110. As a result, in such cases, the power control device 100 does not erroneously turn of the switch 110, and allows the high current to pass in order to charge the capacitive load 20. When the magnitude of the sensed current is less than or equal to the first threshold, the controller 200 determines that neither a short-circuit event or a capacitive overload condition exists, and the controller 200 generates the gate control signal in such a way as to activate or maintain the activated state of the switch 110 and to allow load current to pass through the power control device 100.

The first threshold may be a value close to the current limit. However, due to component tolerances, the first threshold may be about 5% to about 15% below the current limit value. The second threshold may be greater than about 0.5 V/s. The upper limit of the second threshold may depend on power handling capability of the switch 110, safety margin, the capacitive load, the current limit, and the system voltage.

In the description herein, rather than use the term "derivative signal", references are generally made to the "rate of change of the switch voltage", the "rate of change of the voltage drop across the switch", or the like. This is done to better convey the concept behind the invention. However, as will be understood by a person of ordinary skill in the art, in the implementation of the power control device 100, the determinations made based on the "rate of change of the switch voltage" or the "rate of change of the voltage drop across the switch" may in fact be based upon the corresponding derivative signal, which may be a voltage signal.

The controller 200 ensures that the load current $I_{LOAD}$ passing through the switch 110 does not exceed a current limit (e.g., a trip threshold). The current limit may be set to about 10 times the channel current rating. In cross-tie applications, the current limit may be set to about 120% of the nominal rating of the power control device 100, for example, may be about 200 A or higher. However, embodiments of the present disclosure are not limited thereto, and the current limit in other applications may be between 1 A to about 500 A, in some examples. The controller 200 may also provide I2t (current squared over time) overload protection, as well as other functions such as a reporting function (e.g., reporting current and voltage information) to an external circuit.

As shown in FIG. 1, the controller 200 may include a processing circuit (e.g., a processor or central processing circuit (CPU)) 210 and a memory 220 that includes instructions that when executed by the processor 210 perform the operations described above with respect to the controller 200.

The terms "processing circuit" and "processor" are used herein to include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware-configured, (i.e., hard-wired, to perform that function), or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB. Some of the functions performed by the controller 200 may also be performed by suitable analog circuitry.

In some embodiments, the switch 110 include a number of power semiconductors coupled in parallel to increase the current carrying capability of the switch 110 and to further reduce the voltage drop of the switch 110.

Figure 2:
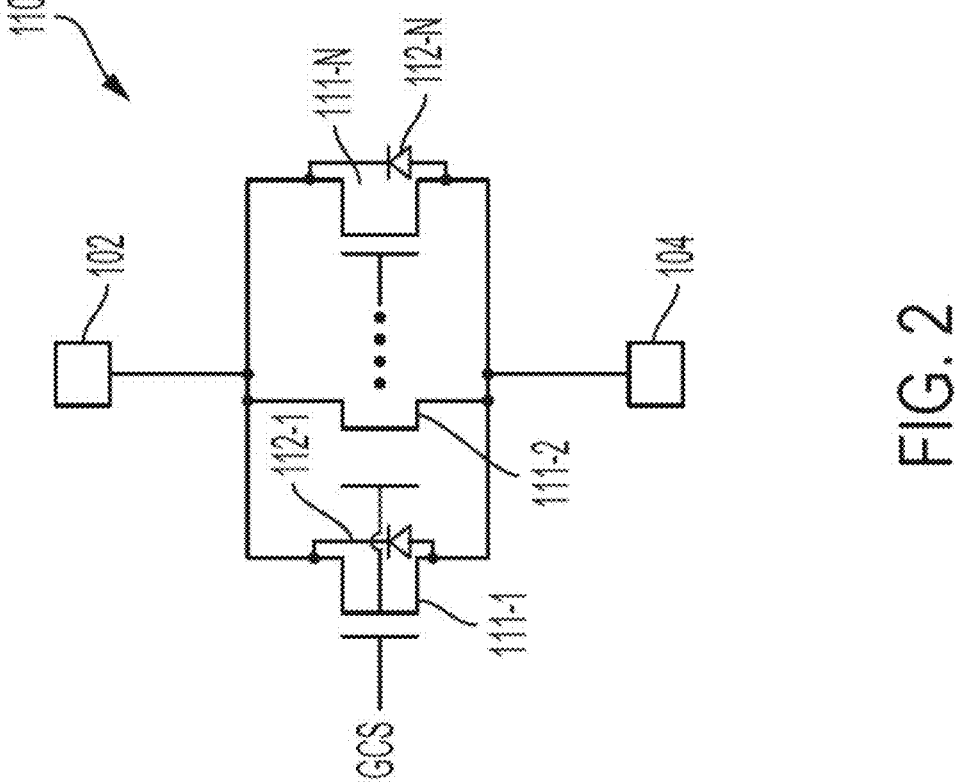
FIG. 2 illustrates a schematic diagram of a switch of the power control device, according to some embodiments of the present disclosure.

FIG. 2 illustrates a schematic diagram of the switch 110, according to some embodiments of the present disclosure.

Referring to FIG. 2, in some embodiments, the switch 110 includes a plurality of field effect transistors (FETs, e.g., MOSFETs) 111-1 to 111-N (where N is an integer greater than one) that are substantially the same and are coupled in parallel. That is, the drain of each of the FETs is coupled to the first terminal 102, a source of each of the FETs is coupled to the second terminal 104, and a gate of each of the FETs is coupled to the same output of the controller 200. Thus, all FETs 111-1 to 111-N concurrently (e.g., simultaneously) receive the same gate control signal GCS. Here, a body diode 112 of each of the FETs includes a cathode coupled to the drain and an anode coupled to the source of the corresponding FET 111.

Using multiple FETs 111 in parallel reduces the overall on-resistance of the switch 110 as the as the resistance of each FET 111 is in parallel with the resistances of the other FETs 111. This leads to an increase in the current carrying capacity of the switch 110 and to a reduction in the voltage drop of the switch 110.

The on-resistance of each FET 111 may depend on its voltage rating. For example, the on-resistance of 100 V (i.e., a low-voltage) FET may be about 2 milliohms or less, the on-resistance of a 600 V FET may be about 6 milliohms or less, and the on-resistance of a 1000 V (i.e., a high-voltage) FET may be about 25 milliohms or less. Using a switch 110 with eight such FETs connected in parallel may reduce the on-resistance to about 0.25 milliohms or less for 100 V FETs, to about 0.75 milliohms or less for 600 V FETs, or to about 3.125 milliohms or less for 1000 V FETs. In such examples, when used in a high current application (e.g., at about 150 A), the resultant voltage drop across the switch 110 may be substantially reduced. As such, the parallel connection of the FETs 111-1 to 111-N also leads to substantially reduced power dissipation by the switch 110 and thus the power control device 100.

Figure 3:
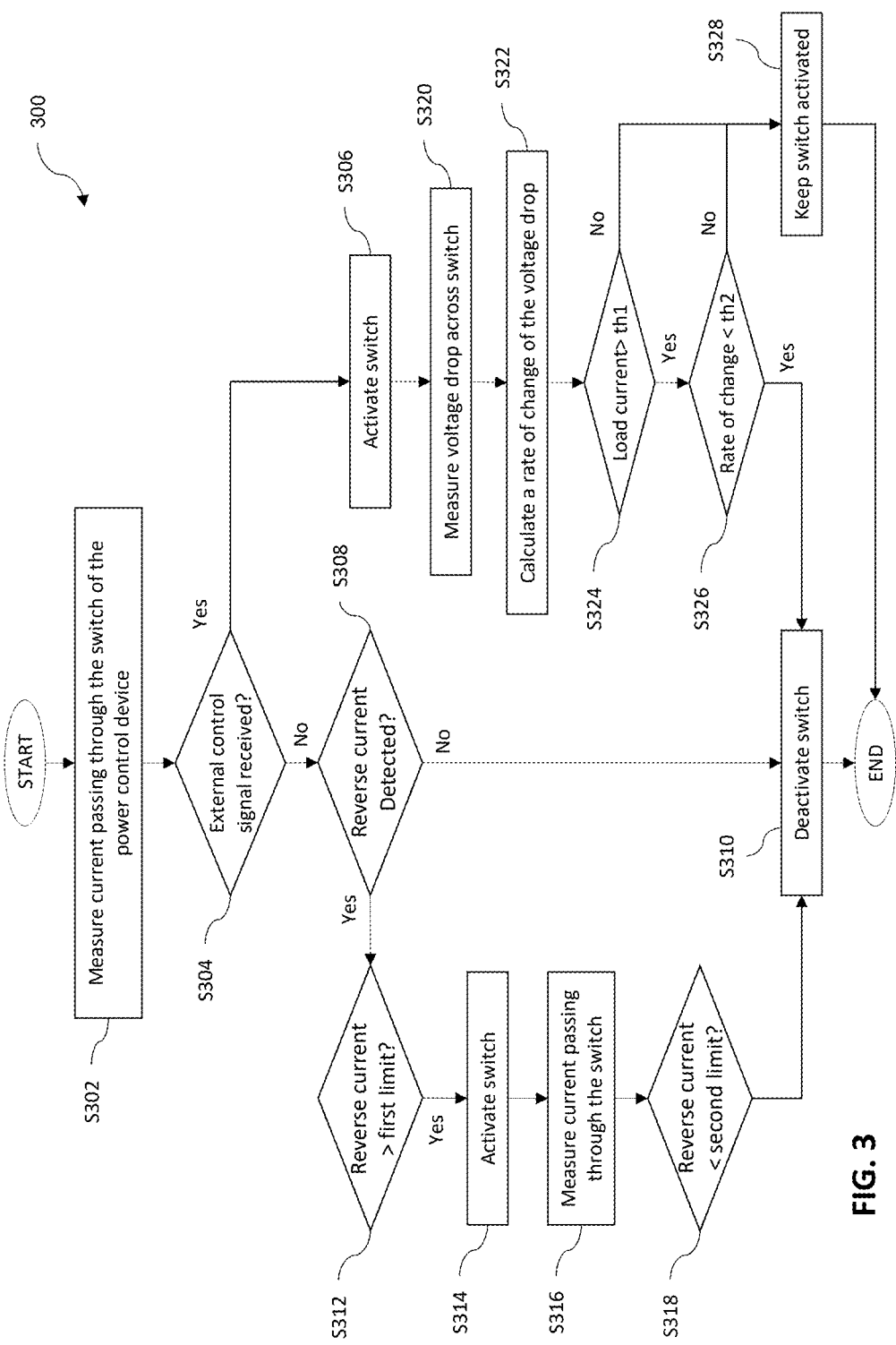
FIG. 3 is a flow diagram illustrating a process of controlling current flow between a first and second terminals of the power control device, according to some embodiments of the present disclosure.

FIG. 3 is a flow diagram illustrating a process 300 of controlling current flow between the first terminal 102 and the second terminal 104 of the power control device 100, according to some embodiments of the present disclosure.

According to some embodiments, the power control device 100 (e.g., the current sensor 130) senses/measures the current passing through the switch 110 that is electrically connected between (e.g., in series with) the first and second terminals 102 and 104; and monitors the external control terminal (EXT) 106 of the power control device 100 for presence of an external control signal (e.g., an enable signal; S302). The power control device 100 determines (e.g., determines or detects) whether an external control signal is received at the external control terminal 106 (S304).

In response to determining that the external control signal is received, the power control device 100 activates the switch 110 to provide a low-resistance path for a current from the first terminal 102 to the second terminal 104 (S306). However, when no external control signal has been received, the power control device 100 determines whether the sensed current is a reverse current from the second terminal 104 to the first terminal 102 (S308). If no external control signal has been received, the power control device 100 deactivates the switch 110 to shut off current from the first terminal 102 to the second terminal 104 or maintains its deactivated state (S310).

When a reverse current is detected, the power control device 100 determines whether the magnitude of the reverse current exceeds a first limit (S312). In some examples, the first limit may be about 10 A. If the magnitude of the reverse current exceed this limit, the power control device 100 activates the switch 110 to provide a resistance path for the reverse current from the second terminal 104 to the first terminal 102 (S314).

The power control device 100 then continues to monitor the magnitude of the reverse current (S316), and when the magnitude of the reverse current drops below a second limit (S318), the power control device 100 deactivates the switch (S310). At this point, any reverse current may be conducted through the body diode of the switch 110. The second limit may be set less than the first limit. For example, the second limit may be about 5 A. The first limit and the smaller second limit create a hysteresis to turn the switch 110 (e.g., the FETs 111) OFF in time when the current is switched to forward mode (similar to reverse recovery).

In some embodiments, when the switch 110 is active (e.g., as a result of the an external control signal being detected (S306)), the power control device 100 (e.g., the voltage sensor 120) senses/measures the voltage drop across the switch 110 via the voltage sensor 120 (S320). The power control device 100 (e.g., the controller 200) then determines a rate of change of the voltage drop across the switch 110 (S322).

The power control device 100 (e.g., the detector 150) then determines whether to deactivate the switch 110 based on the load current and the rate of change of the voltage drop across the switch 110 (S324-S326).

In so doing, the power control device 100 determines whether the current (e.g., load current) is above the first threshold (S324). When the load current is less than or equal to the first threshold (i.e., when the magnitude of the load current is low), the power control device 100 determines that no short circuit event or capacitive overload condition exists, and activates or maintains the activated state of the switch 110 (S326).

When the load current is greater than the first threshold (i.e., when the magnitude of the load current is high), the resistor short circuit condition or a capacitive inrush current may be present, and the power control device 100 attempts to distinguish these two conditions by determining whether the rate of change of the voltage drop across the switch is less than a second threshold (S326). When the rate of change is greater than or equal to the second threshold (i.e., the rate of change is high), the power control device 100 determines that a capacitive load is present and allows the current to pass through the switch 110 by keeping the switch 110 activated (S328), thus avoiding an erroneous nuisance trip. When the rate of change is less than the second threshold (i.e., the rate of change is low), the power control device 100 determines that a resistive short-circuit is present (e.g., at the second circuit 20). After detecting a short-circuit event, the power control device 100 monitors the load current and rate of change for the duration of the hold-off period Δt (e.g., about 50 μS). If the short-circuit event is still present after passage of the hold-off period Δt, the power control device 100 proceeds to deactivate the switch to shut off the high current passing to the second circuit 20 (S310). The hold-off period allows the protection circuit to avoid nuisance trips of the switch 110.

Accordingly, the power control device 100 is capable of quickly differentiating between resistive and capacitive inrush currents by using measured time rate of change of voltage and magnitude of inrush current to avoid nuisance trips while facilitating simpler wire/load protection circuit designs to protect against resistive short-circuits. This solution also provides the switching capability for capacitive load systems or pulse energy loads to operate with the fast switching time without pre-charge or soft-start functionality, which are costly and have slow response.

As will be understood by a person of ordinary skill in the art, the temporal order of some of the operations described above may be varied. For example, the order in which the operations S304 and S308 are performed can be reversed, and similarly the order of operations S324 and S326 can be reversed.

The functionality provided by the power control device 100, according to some embodiments, makes it suitable for (e.g., ideal for) some power distribution applications, such as in vehicle management systems (such as in airborne vehicles).

In many electrical power distribution applications (such as airborne applications), power of different electrical sources are shared between electrical power distribution equipment to provide redundancy and to ensure the continued operation of the system even when one or more power sources go offline. The sharing of the power may be accomplished through cross-ties, which act as interconnections between two electrical power management equipment and are generally designed to carry sizable current (e.g., 400 A or more).

Figure 4:
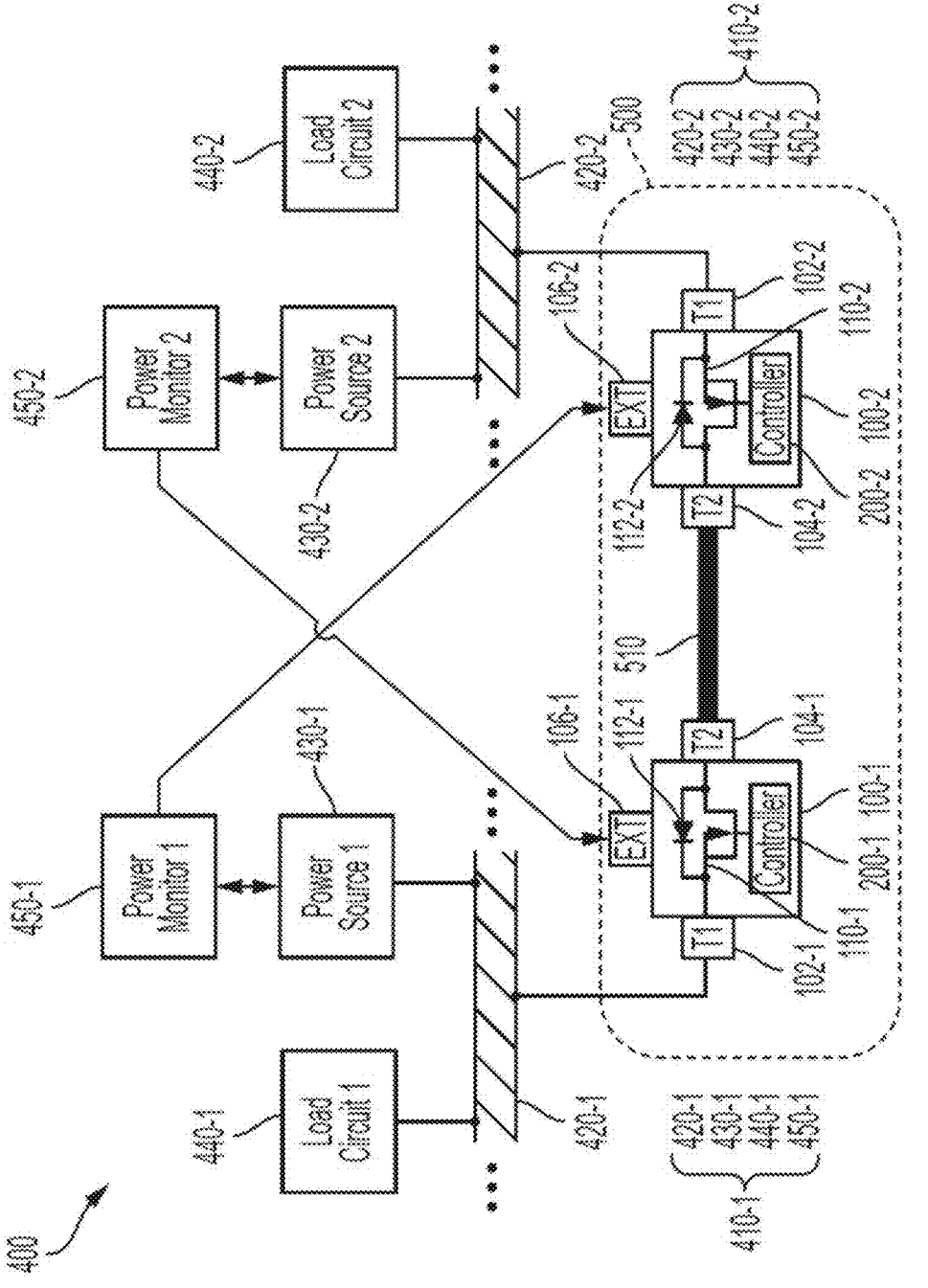
FIG. 4 illustrates a power distribution system utilizing the power control device, according to some embodiments of the present disclosure.

FIG. 4 illustrates a power distribution system 400, according to some embodiments of the present disclosure.

In some embodiments, the power distribution system 400 includes a first power block 410-1 and a second power block 410-2, which are interlinked by a bus bridge 500.

The first power block 410-1 includes a first electrical bus (e.g., a first busbar) 420-1 to which the electrical components of the first power block 410-1 are connected; a first power source 430-1 configured to provide electrical power to the first electrical bus 420-1; and one or more first load circuits 440-1 coupled to, and configured to draw electrical power from, the first electrical bus 420-1. Similarly, the second power block 410-2 includes a second electrical bus (e.g., a second busbar) 420-2 to which the electrical components of the second power block 410-2 are connected; a second power source 430-2 configured to provide electrical power to the second electrical bus 420-2; and one or more second load circuits 440-2 coupled to, and configured to draw electrical power from, the second electrical bus 420-2.

In some examples, the each of the power blocks 410-1/410-2 further includes a power monitor 450-1/450-2 configured to monitor (e.g., only or exclusively monitor) the corresponding power source 430-1/430-2 and to generate a fault signal in response to failure of the corresponding power source 430-1/430-2. The power monitor 450-1/450-2 may also generate the fault signal when the current draw on the corresponding electrical bus 410-1/410-2 exceeds the maximum capability of the power source 430-1/430-2 to supply. Each power monitor 450-1/450-2 may be dedicated solely to its corresponding power source 430-1/430-2. That is, the first power monitor 450-1 may only monitor the first power source 430-1 and not the second power source 430-2, and the second power monitor 450-2 may only monitor the second power source 430-2 and not the first power source 430-1.

In some embodiments, the bus bridge 500 is electrically coupled between the electrical buses 420-1 and 420-2 and enables the bi-directional transfer (e.g., sharing) of electrical power between the two power blocks 410-1 and 410-2. The bus bridge 500 is the sole path (i.e., only path) of current conduction between the first and second electrical buses 420-1 and 420-2. In other words, the first and second electrical buses 420-1 and 420-2 are electrically isolated from one another except for the bus bridge 500. Thus, by selectively electrically coupling/decoupling the electrical buses 420-1 and 420-2, the bus bridge 500 may permit the flow of current from one power block 410-1/410-2 to the other 410-2/410-1, or prevent (e.g., shut off) the flow of current between the two power blocks 410-1 and 410-2.

According to some embodiments, the bus bridge 500 includes a first power control device 100-1, a second power control device 100-2, and a cross-tie (e.g., a conductive connection) 510. The cross-tie 510 may be a conductive link that is coupled electrically in series with the first and second power control devices 100-1 and 100-2, and is capable of conducting large currents (e.g., about 400 A or more) between the two power blocks 410-1 and 410-2 (i.e., between the electrical buses 420-1 and 420-2). The first and second power control devices 100-1 and 100-2, may be the same or substantially the same as the power control device 100 described above with respect to FIGS. 1-3. As such, for the sake of brevity, a detailed description thereof may not be repeated.

As will be understood by a person of ordinary skill in the art, while FIG. 4 illustrates the power control devices 100-1 and 100-2 as being outside of the power blocks 400-1 and 400-2, the definition of each power block 400-1/400-2 may be expanded to include the corresponding power control device 100-1/100-2.

In some embodiments, the two power control devices 100-1 and 100-2 are oriented back-to-back at opposite sides of the cross-tie 510. For example, the first terminal 102-1 of the first power control devices 100-1 may be connected to the first electrical bus 420-1, and the second terminal 104-1 of the power control devices 100-1 may be connected to one end of the cross-tie 510. Further, the first terminal 102-2 of the second power control devices 100-2 may be connected to the second electrical bus 420-2, and the second terminal 104-2 of the second power control devices 100-2 may be connected to another end of the cross-tie 510.

According to some embodiments, each of the power control devices 100-1/100-2 receives the fault signal from the power monitor 450-2/450-1 of the other power block 410-2/410-1 at its external control terminal (EXT) 106-1/106-2. That is, the first power control device 100-1 receives the fault signal from the second power monitor 450-2 at its external control terminal (EXT) 106-1, and the second power control device 100-2 receives the fault signal from the first power monitor 450-1 at its external control terminal (EXT) 106-2. This allows each power control device 100-1/100-2 to respond to power failures at the other power block 400-2/400-1.

In normal conditions when the first and second power sources 430-1 and 430-2 are operational and supplying sufficient power to their corresponding electrical buses 420-1 and 420-2 to support the respective load circuits 440-1 and 440-2, both of the power control devices 100-1 and 100-2 may be deactivated (e.g., OFF), thus preventing the flow of any current through the cross-tie 510. This may represent the default state of the power distribution system 400.

In an abnormal condition when a power source is unavailable (e.g., due to failure) or additional power is needed from a neighboring power source, the power distribution system 400 activates the cross-tie 510 to provide power to the otherwise un-powered/under-powered busbar through a low-resistance and high current-capacity path.

In some embodiments, when there is a power failure at the second power block 400-2, the second power monitor 450-2 transmits a fault signal to the first power control device 100-1 (e.g., to the external control terminal 106-1) causing it to activate and turn ON the first switch 110-1. At this time, while the second power control is deactivated and the second switch 110-2 is OFF, some current may pass through the cross-tie 510 (from the first power block 400-1 to the second power block 400-2) by virtue of the second body diode 112-2. In response to the reverse current passing through the second power control device 100-2, the second controller 200-2 quickly activates the second switch 110-2 thus creating a low-resistance current path through the second power control device 100-2. This reaction of the second power control device 100-2 is automatic and does not require a control signal from any power block. Thus, the second power control device 100-2, which receives power through the cross-tie 510 operates similar to an ideal diode allowing the electrical power to be fed to second electrical bus 420-2 with reduced (e.g., minimal) power dissipation, while preventing reverse current from the second electrical bus 420-2. In a scenario where the second power source 430-2 is recovered and available again, the second power control device 100-2 provides isolation between the power blocks 400-1 and 400-2 and prevents the back flow of the current (i.e., reverse conduction) to the first electrical bus 420-1 through the cross-tie 510.

Similarly, when there is a power failure at the first power block 400-2, the first power monitor 450-1 transmits a fault signal to the second power control device 100-2 causing it to turn ON the second switch 110-2. The passage of current from the second power block 400-2 to the first power block 400-1 through the first body diode 112-1, which is identified as a reverse current by the first power control device 100-1, causes it to automatically activate the first switch 110-1 thus creating a low-resistance current path through the first power control device 100-1. In this example, if the first power control device 100-1 becomes available again, the first power control device 100-1 provides isolation and prevents the back flow of the current (i.e., reverse conduction) to the second electrical bus 420-2 through the cross-tie 510.

As described above with reference to FIGS. 1-3, while the internal switch 110-1/110-2 is ON, the corresponding power control device 100-1/100-2 monitors for and provides over-current and short circuit protection. In other words, the bus bridge 500 has built-in over-current and short circuit pro-tection.

In some embodiments, when unknown power sharing between the first electrical bus 420-1 and second electrical bus 420-2 is desired, both power control devices can be commanded ON and bidirectional current flow may be allowed with reduced (e.g., minimal) voltage drop and power dissipation.

The bus bridge 500 of the power distribution system 400, which utilizes the two power control devices 100-1 and 100-2, offers a number of distinct advantages over the related art including significantly smaller foot print, reduced (minimal) power loss, and significantly faster response time.

In the related art, electromechanical contactors may be used to switch the power between two power blocks. In this arrangement, the control of the two cross-tie contactors needs to be coordinated. When power is needed by one of the power blocks, the two contactors have to be commanded to close, allowing the power to flow from the available source to the other power block. Each of the contactors incorporate protective functions to interrupt the power from the cross-tie in case of a fault, or short circuit. The control system for this function can be complex, depending on the electrical system architecture, and interconnection of the available power sources. This is in contrast to the power distribution system 400 of the present disclosure, in which only one power control device 100-1/100-2 is commanded to activate while the other activates autonomously and automatically.

Further, because of the large currents passing through the cross-tie (e.g., around 400 A), the contactors of the related art are fairly large and require a fuse or the like to interrupt power in the case of a short-circuit condition, which only adds to the size and cost of the overall system. Additionally, high power electromechanical contactors have an operate and release time of about 25 ms to about 35 ms, which means that it may take about 25-35 ms to close a contactor and energize the cross-tie connection. This is a long enough time that the sequencing of the cross-tie contactors for reconfiguration of the electrical system may create an unde-sirable power interruption that could cause a cascading failure in the electrical system.

This is in stark contrast to the power control devices 100 of the present disclosure, which occupy a small footprint (e.g. about 10 square inches of surface area to mount the device to a chassis wall) and are light weight due to the use of solid-state technology, dissipate a small amount of power at high currents (e.g., about 20 Watts at 400 A), and have fast response time of less than 1 ms. Further, the protection functionality that is built into the power control devices 100 of the present disclosure obviates that need for additional fuses and protection circuits, which reduces the complexity of the bus bridge 500 and the power distribution system 400. This makes the use of the power control devices 100 in the power distribution system ideal for many applications including airborne vehicle applications, where size, weight, power dissipation and speed are of utmost importance.

Figure 5:
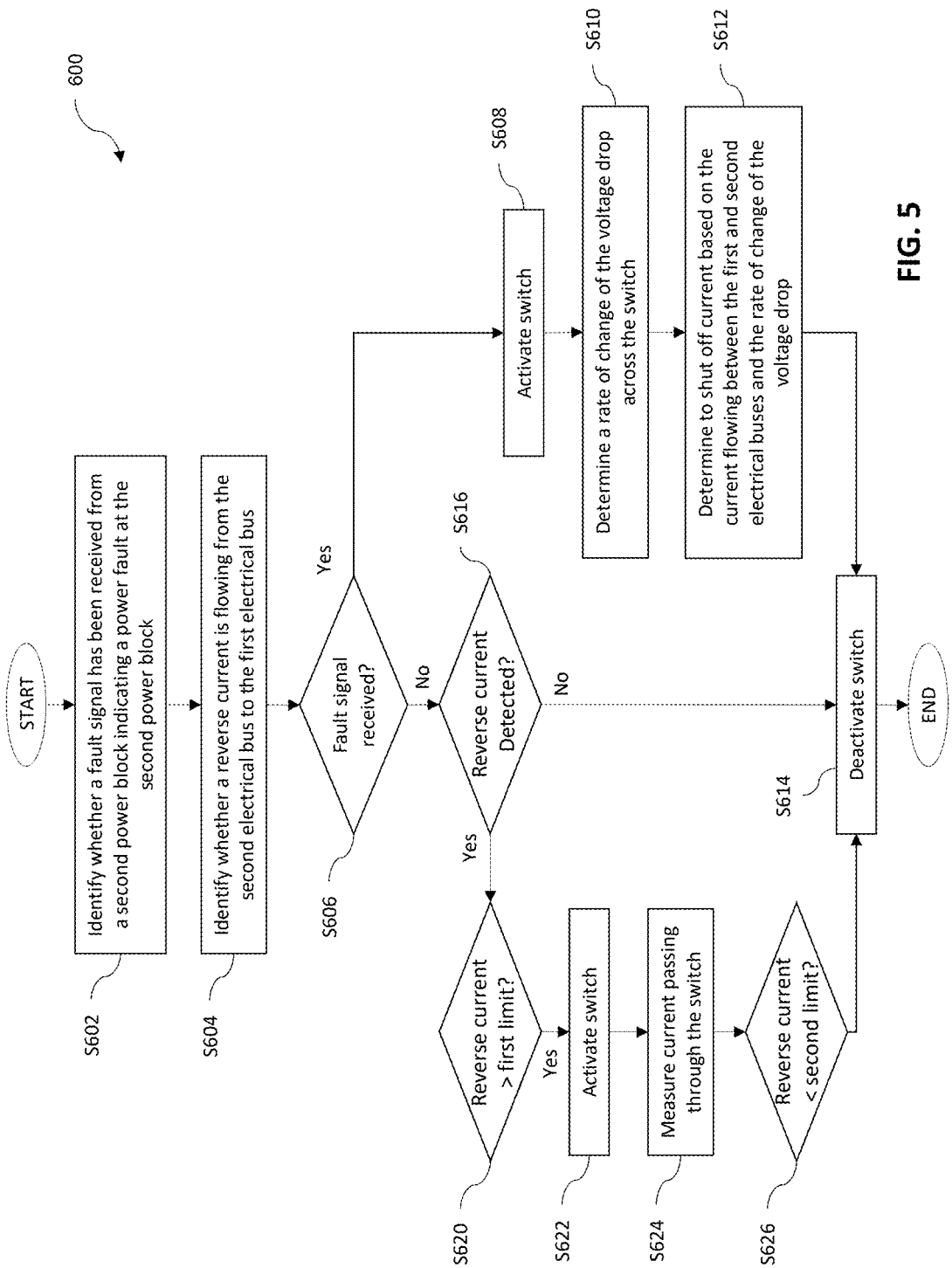
FIG. 5 illustrates a process of controlling current flow between a first electrical bus of a first power block and a second electrical bus of a second power block, according to some embodiments of the present disclosure.

FIG. 5 illustrates a process 600 of controlling current flow between a first electrical bus 420-1 of a first power block 400-1 and a second electrical bus 420-2 of a second power block 400-2, according to some embodiments of the present disclosure.

In some embodiments, the first power control device 100-1 of the first power block 400-1 identifies whether a fault signal (e.g., a second fault signal) has been received from the second power block 400-2 indicating a power fault at the second power block 400-2 (S602), and identifies whether a reverse current is flowing from the second elec-trical bus 420-2 to the first electrical bus 420-1 (S604).

In some embodiments, in response to identifying that the second fault signal is received (S606), the first power control device 100-1 activates the first switch 110-1 to enable current flow between the first and second electrical buses (S608). Here, in response to current flowing from the first power block 400-1 to the second power block 400-2, the second power control device 100-2 automatically activates (e.g., activates without the use of any external signals to the second power control device 100-2) a second switch 110-2 to provide a low-resistance current path from the first power block 400-1 to the second power block 400-2.

The first power block 400-1 may cap the current flow when the first switch 110-1 is active. In some embodiments, in response to the activating the first switch, the first power block 400-1 determines a rate of change of a voltage drop across the first power control device 100-1 (S610). The first power block 400-1 then determines to shut off current based on the current flowing between the first and second electrical buses and the rate of change of the voltage drop (S612), and deactivates the first switch 110-1 to block current flow between, and electrically isolate, the first and second elec-trical buses 420-1 and 420-2 (S614). In some examples, the first power control device 100-1 determines to shut off current by determining that the current is above a first threshold, and that the rate of change of the voltage drop is less than a second threshold. Otherwise, the first power control device 100-1 keeps the first switch 110-1 activated.

In some embodiments, in response to identifying that there is no reverse current and identifying that no external control signal has been received (S606), the first power control device 100-1 deactivates the first switch to shut off current flow between the first and second electrical buses 420-1 and 420-2 (S614).

However, when a reverse current is detected (S616), similar to the process 300 described above with respect to FIG. 3, the first power control device 100-1 controls the first switch 110-1 based on a hysteresis loop. In some embodi-ments, the first power control device 100-1 determines whether the magnitude of the reverse current exceeds a first limit (S620). In some examples, the first limit may be about 10 A. If the magnitude of the reverse current exceed this limit, the first power control device 100-1 activates the first switch 110-1 to provide a low-resistance path for the reverse current from the second electrical bus 420-2 to the first power block 400-1 (S622).

The first power control device 100-1 then continues to monitor the magnitude of the reverse current (S624), and when the magnitude of the reverse current drops below a second limit (S626), the power control device 100 deactivates the first switch 110-1 (S614). At this point, any reverse current may be conducted through the body diode of the first switch 110-1. The second limit may be set to about 5 A. The hysteresis produced by the first limit and the smaller second limit ensures that the first switch 110-1 is deactivated (e.g., ensures that the FETs 111 are OFF) in time when the current is switched to forward mode.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," "comprising," "has," "have," and "having," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For example, the expression "A and/or B" denotes A, B, or A and B. Expressions such as "one or more of" and "at least one of," when preceding a list of elements, modify the entire list of elements and do not modify the individual elements of the list. For example, the expression "one or more of A, B, and C," "at least one of A, B, or C," "at least one of A, B, and C," and "at least one selected from the group consisting of A, B, and C" indicates only A, only B, only C, both A and B, both A and C, both B and C, or all of A, B, and C.

Further, the use of "may" when describing embodiments of the inventive concept refers to "one or more embodiments of the inventive concept." Also, the term "exemplary" is intended to refer to an example or illustration.

It will be understood that, although the terms "first", "second", "third", etc., may be used herein to describe various elements, components, and/or sections, these elements, components, and/or sections should not be limited by these terms. These terms are used to distinguish one element, component, or section from another element, component, or section. Thus, a first element, component, or section discussed below could be termed a second element, component, or section, without departing from the scope of the inventive concept.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", "in contact with", "in direct contact with", or "immediately adjacent" another element or layer, there are no intervening elements or layers present.

As used herein, the terms "use", "using", and "used" may be considered synonymous with the terms "utilize", "utilizing", and "utilized", respectively.

As used herein, the term "substantially," "about," and similar terms are used as terms of approximation and not as terms of degree, and are intended to account for the inherent variations in measured or calculated values that would be recognized by those of ordinary skill in the art. Further, if the term "substantially" is used in combination with a feature that could be expressed using a numeric value, the term "substantially" denotes a range of +/−5% of the value centered on the value.

When one or more embodiments may be implemented differently, a specific process order may be performed differently from the described order. For example, (i) the disclosed operations of a process are merely examples, and may involve various additional operations not explicitly covered, and (ii) the temporal order of the operations may be varied.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The power control device and/or any other relevant devices or components according to embodiments of the present invention described herein, such as the controller and the detector, may be implemented utilizing any suitable hardware, firmware (e.g. an application-specific integrated circuit), software, or a suitable combination of software, firmware, and hardware. For example, the various components of the power control device may be formed on one integrated circuit (IC) chip or on separate IC chips. Further, the various components of the power control device may be implemented on a flexible printed circuit film, a tape carrier package (TCP), a printed circuit board (PCB), or formed on a same substrate. Further, the various components of the power control device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, and scope of this disclosure, as set forth in the following claims and equivalents thereof.

What is claimed is:

1. A power distribution system comprising:
a first electrical bus coupled to a first power source configured to provide electrical power to the first electrical bus;
a second electrical bus coupled to a second power source configured to provide electrical power to the second electrical bus; and
a bus bridge configured to selectively couple the first and second electrical buses, and comprising:
a first power control device comprising a first switch coupled between the first electrical bus and the second electrical bus, and configured to perform:
determining whether a second fault signal indicating failure of the second power source has been received;
determining whether a reverse current is flowing from the second electrical bus to the first electrical bus; and
in response to the determining that the reverse current is flowing and the determining that the second fault signal is not received,
activating the first switch to enable current flow between the first and second electrical buses.

2. The power distribution system of claim 1, wherein the first power control device is further configured to perform, in response to the determining that the reverse current is flowing:
determining that the reverse current exceeds a first limit, and
wherein the activating the first switch is in response to the determining that the reverse current exceeds the first limit.

3. The power distribution system of claim 2, wherein the first power control device is further configured to perform, in response to the determining that the reverse current is flowing:
measuring the reverse current through the first switch;
determining that the reverse current is less than a second limit; and
in response, deactivating the first switch to shut off current flow between the first and second electrical buses.

4. The power distribution system of claim 3, wherein the second limit is less in magnitude than the first limit.

5. The power distribution system of claim 1, wherein the activating the first switch in response to the determining that the reverse current is flowing provides a low-resistance path for the reverse current from the second electrical bus to the first electrical bus.

6. The power distribution system of claim 1, wherein the first power control device is further configured to perform:
in response to determining that there is no reverse current and determining that no external control signal has been received,
deactivating the first switch to shut off current flow between the first and second electrical buses.

7. The power distribution system of claim 1, wherein the first power control device is configured to receive the second fault signal is from a second power monitor coupled to the second power source, and
wherein the second power monitor is configured to monitor the second power source and to generate the second fault signal in response to the failure of the second power source.

8. The power distribution system of claim 1, wherein the bus bridge is an only path of current conduction between the first and second electrical buses.

9. The power distribution system of claim 1, wherein the bus bridge further comprises:
a cross-tie configured to conduct current between the first and second electrical buses,
wherein the cross-tie is coupled electrically in series with the first power control device between the first and second electrical buses.

10. The power distribution system of claim 1, wherein the first power control device is further configured to limit a current flowing through the first switch to a current limit.

11. The power distribution system of claim 1, further comprising:
in response to determining that the second fault signal is received,
activating the first switch to enable current flow between the first electrical bus to the second electrical bus,
wherein the activating the first switch in response to the determining that the second fault signal is received provides a low-resistance path for a current from the first electrical bus to the second electrical bus.

12. The power distribution system of claim 11, wherein the first power control device is further configured to perform, in response to the activating the first switch,
determining a rate of change of a voltage drop across the first power control device;
determining to shut off current based on the current flowing between the first and second electrical buses and the rate of change of the voltage drop; and
deactivating the first switch to block current flow between and electrically isolate the first and second electrical buses.

13. The power distribution system of claim 1, further comprising:
a second power control device comprising a second switch coupled electrically in series with the first power control device and the second electrical bus,
wherein, in response to current flowing from the first electrical bus to the second electrical bus, the second power control device is configured to automatically activate the second switch to provide a low-resistance current path from the first electrical bus to the second electrical bus.

14. The power distribution system of claim 1, further comprising:
a first power monitor configured to monitor the first power source and to generate a first fault signal in response to failure of the first power source,
wherein the bus bridge further comprises:
a second power control device comprising a second switch coupled electrically in series with the first power control device and the second electrical bus, and configured to perform:
determining whether a current is flowing from the first electrical bus to the second electrical bus;
determining whether the first fault signal indicating failure of the first power source has been received; and
in response to determining that the current is flowing from the first electrical bus to the second electrical bus and determining that the first fault signal is not received,
activating the second switch to enable current flow between the first and second electrical buses.

15. The power distribution system of claim 14, wherein the second power control device is further configured to perform:

in response to identifying that there is no current flowing
from the first electrical bus to the second electrical bus
and identifying that the second fault signal has not been
received,
  deactivating the second switch to shut off current flow
  between the first and second electrical buses.

16. The power distribution system of claim 14, wherein
the second power control device is configured to receive the
first fault signal is from the first power monitor coupled to
the first power source, and
  wherein the first power monitor is configured to monitor
  the first power source and to generate the first fault
  signal in response to the failure of the first power
  source.

17. A method of controlling current flow between a first
electrical bus of a first power block and a second electrical
bus of a second power block, the method comprising:
  identifying, by a first power control device of the first
  power block, whether a fault signal has been received
  from the second power block indicating a power fault
  at the second power block;
  identifying, by the first power control device, whether a
  reverse current is flowing from the second electrical
  bus to the first electrical bus; and
  in response to at least one of identifying that the reverse
  current is flowing and identifying that the fault signal is
  received,
    activating, by the first power control device, a first
    switch to enable current flow between the first and
    second electrical buses,
  wherein the first power control device and a second power
  control device are coupled in series between the first
  and second electrical buses.

18. The method of claim 17, wherein, in response to
current flowing from the first power block to the second
power block, the second power control device is configured
to automatically activate a second switch to provide a
low-resistance current path from the first power block to the
second power block.

19. The method of claim 17, further comprising:
  in response to identifying that there is no reverse current
  and identifying that no external control signal has been
  received,
    deactivating the first switch to shut off current flow
    between the first and second electrical buses.

20. The method of claim 17, wherein a cross-tie is coupled
in series between the first and second power control devices
and is an only path of current conduction between the first
and second electrical buses.

21. The method of claim 17, further comprising, in
response to the activating the first switch:
  determining a rate of change of a voltage drop across the
  first power control device;
  determining to shut off current based on the current
  flowing between the first and second electrical buses
  and the rate of change of the voltage drop; and
  deactivating the first switch to block current flow between
  and electrically isolate the first and second electrical
  buses.

22. The method of claim 21, wherein the first power
control device determines to shut off current by:
  determining that the current is above a first threshold; and
  determining that the rate of change of the voltage drop is
  less than a second threshold.

* * * * *